United States Patent
Chari et al.

(10) Patent No.: US 10,631,168 B2
(45) Date of Patent: Apr. 21, 2020

(54) ADVANCED PERSISTENT THREAT (APT) DETECTION IN A MOBILE DEVICE

(71) Applicant: International Business Machines Corporation, Armonk, NY (US)

(72) Inventors: Suresh Chari, Scarsdale, NY (US); Zhongshu Gu, Ridgewood, NJ (US); Heqing Huang, Mahwah, NJ (US); Xiaokui Shu, Ossining, NY (US); Jialong Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/937,897

(22) Filed: Mar. 28, 2018

(65) Prior Publication Data

US 2019/0306719 A1    Oct. 3, 2019

(51) Int. Cl.
*H04M 1/66* (2006.01)
*H04W 12/12* (2009.01)
(Continued)

(52) U.S. Cl.
CPC .............. *H04W 12/12* (2013.01); *G06F 9/54* (2013.01); *G06F 21/53* (2013.01); *G06F 21/554* (2013.01);
(Continued)

(58) Field of Classification Search
CPC ..... H04W 12/12; H04W 12/08; G06F 21/554; G06F 9/54; G06F 21/53; G06F 21/6218; G06F 2221/2141
(Continued)

(56) References Cited

U.S. PATENT DOCUMENTS 9,641,544 B1    5/2017    Treat et al.
10,397,255 B1 *  8/2019    Bhalotra ............. H04L 63/1433
(Continued)

FOREIGN PATENT DOCUMENTS

CN    105095768    8/2015
CN    106612287    1/2017
CN    106909847    2/2017

OTHER PUBLICATIONS

Grill, "Detecting malicious network behavior using only TCP flag information," IPCOM000238173D, Aug. 6, 2014.
(Continued)

*Primary Examiner* — Khoi H Tran
*Assistant Examiner* — B M M Hannan
(74) *Attorney, Agent, or Firm* — Jeffrey S. LaBaw; David H. Judson

(57) ABSTRACT

Advanced persistent threats to a mobile device are detected and prevented by leveraging the built-in mandatory access control (MAC) environment in the mobile operating system in a "stateful" manner. To this end, the MAC mechanism is placed in a permissive mode of operation wherein permission denials are logged but not enforced. The mobile device security environment is augmented to include a monitoring application that is instantiated with system privileges. The application monitors application execution parameters of one or more mobile applications executing on the device. These application execution parameters including, without limitation, the permission denials, are collected and used by the monitoring application to facilitate a stateful monitoring of the operating system security environment. By assembling security-sensitive events over a time period, the system identifies an advanced persistent threat (APT) that otherwise leverages multiple steps using benign compo-
(Continued)

nents. Once an APT has been detected, a mitigation action (e.g., terminating the malicious process) is undertaken.

18 Claims, 4 Drawing Sheets

(51) Int. Cl.
*H04W 12/08* (2009.01)
*G06F 21/62* (2013.01)
*G06F 21/53* (2013.01)
*G06F 9/54* (2006.01)
*G06F 21/55* (2013.01)

(52) U.S. Cl.
CPC ........ *G06F 21/6218* (2013.01); *H04W 12/08* (2013.01); *G06F 2221/2141* (2013.01)

(58) Field of Classification Search
USPC ......................................................... 455/410
See application file for complete search history.

(56) References Cited

U.S. PATENT DOCUMENTS

| | | | | |
|---|---|---|---|---|
| 2003/0005331 | A1* | 1/2003 | Williams | H04L 63/0272 726/15 |
| 2006/0095968 | A1 | 5/2006 | Portolani et al. | |
| 2007/0079375 | A1* | 4/2007 | Copley | G06F 21/566 726/22 |
| 2007/0180509 | A1* | 8/2007 | Swartz | G06F 9/4406 726/9 |
| 2008/0127292 | A1* | 5/2008 | Cooper | G06F 21/53 726/1 |
| 2008/0189796 | A1* | 8/2008 | Linn | G06F 21/51 726/30 |
| 2009/0158430 | A1 | 6/2009 | Borders | |
| 2015/0096024 | A1* | 4/2015 | Haq | H04L 63/145 726/23 |
| 2015/0264077 | A1* | 9/2015 | Berger | G06F 21/554 726/23 |
| 2015/0269383 | A1* | 9/2015 | Lang | G06F 21/57 726/1 |
| 2015/0317475 | A1* | 11/2015 | Aguayo Gonzalez | G06F 21/55 726/23 |
| 2015/0332043 | A1* | 11/2015 | Russello | G06F 11/30 726/23 |
| 2016/0057166 | A1* | 2/2016 | Chesla | H04L 63/02 726/23 |
| 2016/0283713 | A1* | 9/2016 | Brech | G06F 9/45558 |
| 2017/0063917 | A1* | 3/2017 | Chesla | H04L 63/1433 |
| 2017/0099306 | A1* | 4/2017 | Chiu | H04L 63/1416 |
| 2017/0346851 | A1* | 11/2017 | Drake | H04L 63/1466 |
| 2019/0108330 | A1* | 4/2019 | Sikder | G06F 21/52 |

OTHER PUBLICATIONS

Anonymous, "System and method to impose a realtime permissive check before permissive check before forwarding contact information," IPCOM000241536D, May 8, 2015.

Moon et al, "MLDS: Multi-Layer Defense System for Preventing Advanced Persistent Threats," Symmetry 2014.

* cited by examiner

US 10,631,168 B2

ADVANCED PERSISTENT THREAT (APT) DETECTION IN A MOBILE DEVICE

BACKGROUND OF THE INVENTION

Technical Field

This disclosure relates generally to securing access to applications on a mobile device.

Background of the Related Art

Detecting security violations in a computer system as a consequence of cybersecurity threats is quite challenging, as it is very difficult to reason about all types of security risks to which the system may be exposed. Existing security mechanisms, such as anti-virus (AV) systems and intrusion detection/prevention systems (IDS/IPS), generally suffer from high false negatives and/or false positives that limit their effectiveness due to the lack of precision. In particular, AV systems and signature-based IPS/IDS systems rely on malware and attack signatures and, thus, they are often unable to catch zero-day vulnerabilities, multi-stage attacks and advanced persistent threats (APT) that leverage multiple steps, each one of which may appear, in isolation, to be benign. APTs pose very difficult problems. APT actors choose their victims carefully, and they map out their attack plan well before launching an attack. To this end, an advanced, targeted attacker might conduct in-depth reconnaissance to learn what defenses are in place, and then make calculated moves to avoid them. Once the attacker is in the system, they operate low and slow to gradually gain persistence without setting off any alarms. To detect these highly sophisticated and stealthy attacks before the damage is done, there is a need to piece together several seemingly low risk events to find the one extremely high risk cyber-attack underway.

Behavior analysis-based systems were proposed to address these limitations; however, those systems often end up with relatively high false positive rates due to the limited access to information required to build accurate models of system and process behavior. As an alternative to detecting malicious behavior within a single computer system, a number of approaches aim to lock-down systems so as to prevent violations in the first place. These typically implement Mandatory Access Control (MAC) policies, for example, by defining which subjects (processes) can access which objects (files, sockets, and the like). Example realizations of MAC policies include Linux security modules (LSM) like SELinux. These systems confine the behavior of the processes by comparing their behaviors during run time against a predefined or learned profile (policy).

Android is a popular Linux-based mobile device operating system. The Android security model is based in part on the concept of application sandboxes, wherein each mobile application runs in its own sandbox. Prior to Android 4.3, these sandboxes were defined by the creation of a unique Linux identifier for each application at time of installation. Starting with Android 4, SELinux is used to further define the boundaries of the Android application sandbox. While SELinux enables mandatory access control to be implemented on Android, it does not protect against kernel vulnerabilities or anything allowed by a security policy. To address these security gaps, SEAndroid, which is built on top of SELinux, provides additional security, in particular by confining privileged system daemons in the event that they become compromised, and by providing better data isolation between applications, and between applications and system services.

While using SEAndroid on mobile devices provides security advantages, the mandatory access control (MAC) mechanism therein only provides stateless enforcement that cannot foresee or reason against long attack vectors. Thus, the problem of detecting advanced persistent threats on mobile devices remains a very difficult challenge, one that is further exacerbated by device resource constraints and lack of natively-integrated system application programming interfaces (APIs) that might be used to collect security-sensitive event logs indicative of such threats.

The techniques of this disclosure address this problem.

BRIEF SUMMARY

Advanced persistent threats to a mobile device are detected and prevented by leveraging the built-in mandatory access control (MAC) environment in the mobile operating system but in a "stateful" manner. To this end, the mobile device operating system MAC mechanism is placed in a permissive mode of operation. In this mode, permission denials are logged but not enforced. In addition, the mobile device is augmented to include a monitoring application that is instantiated with system privileges. The monitoring application is used to monitor application execution parameters of one or more mobile applications executing on the device. These application execution parameters including, without limitation, the permission denials, are collected (as security-sensitive events) and used by the monitoring application to facilitate a stateful monitoring of the operating system security environment. By assembling these security-sensitive events over a time period, the system can identify an advanced persistent threat (APT) that has leveraged multiple operations or steps using benign components. Once an APT has been detected, one or more mitigation actions (e.g., terminating the malicious process, issuing a notification, etc.) can then be undertaken.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
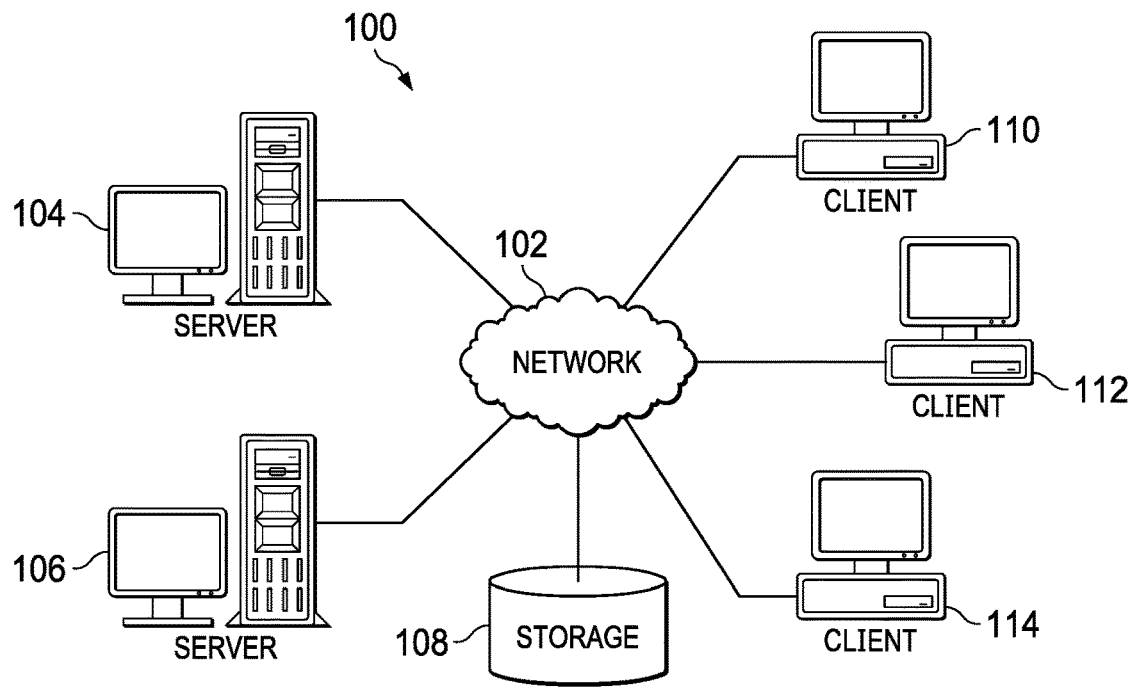
FIG. 1 depicts an exemplary block diagram of a distributed data processing environment in which exemplary aspects of the illustrative embodiments may be implemented.
Figure 2:
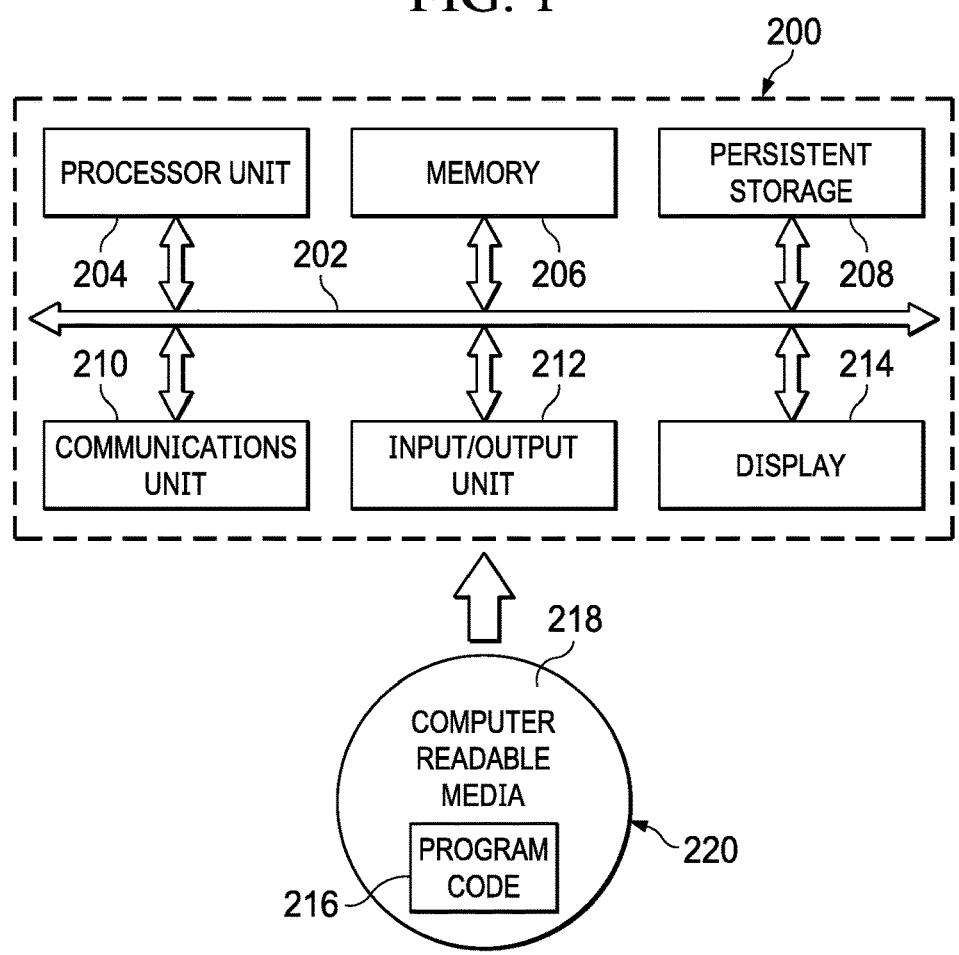
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications.

Figure 3:
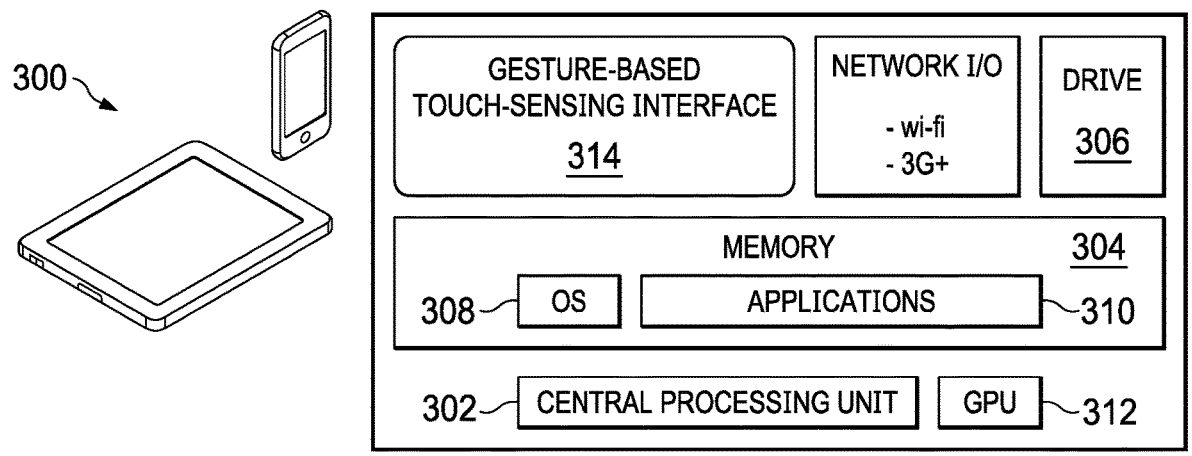
FIG. 3 illustrates a representative mobile device in which the disclosed subject matter may be implemented.

A mobile device is a smartphone or tablet, such as an Android™-based mobile device, or the like. As seen in FIG. 3, a device 300 of this type typically comprises a CPU 302, computer memory 304, such as RAM, and a data store 306. The device software includes operating system (e.g., Android, Blackberry OS, Apple iOS, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards or keypads, cameras, microphones, and the like.

For example, a mobile device as used herein is a 3G—(or next generation) compliant device that may include a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, the mobile device is any wireless client device, e.g., a smartphone, a tablet, a personal digital assistant (PDA, e.g., with GPRS or WiFi-based NIC), a mobile computer with a smartphone or tablet-like client, an Internet Of Things (IoT) device, or the like. Other mobile devices in which the technique may be practiced include any access protocol-enabled device that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Typically, computing devices such as described also implement networking technology for exchanging data over short distances, such as Bluetooth, which is a wireless technology standard that uses short-wavelength UHF radio waves in the ISM band from 2.4 to 2.485 GHz). Devices that implement Bluetooth can create personal area networks (PANs). Bluetooth can connect to several devices at once. Alternatives to Bluetooth include, without limitation, Near Field Communication (NFC), ultra wideband, induction wireless, and others.

The underlying network transport may be any communication medium including, without limitation, cellular, wireless, Wi-Fi, small cell (e.g., Femto), and combinations thereof.

In a representative embodiment, mobile device operating system (OS) 308 is SELinux with security support provided by SEAndroid. Further details of these components are set forth below.

SELinux and SEAndroid

By way of brief background, most operating systems use access controls to determine whether an entity (user or program) can access a given resource. UNIX®-based systems use a form of discretionary access control (DAC), which restricts access to objects based commonly on the groups to which they belong. For examples, files in GNU/Linux have an owner, a group, and a set of permissions. The permissions define who can access a given file, who can read it, who can write to it, and who can execute it. These permissions are split into three sets of users, representing the user (owner of the file), the group (all users who are members of a group), and others (all users who are neither members of the group nor owner of the file). Combining access controls in this manner is problematic because an exploited program or process inherits the access controls of the user and, thus, the program or process is enabled to take actions at the user's access level, which is undesirable. To address this problem, an approach called mandatory access control (MAC) is utilized. In a mandatory access control environment, programs and processes are only enabled to do what they need to perform a task, but nothing more. With MAC in place, even if a program or process is exploited or compromised, its access is explicitly minimized.

Figure 4:
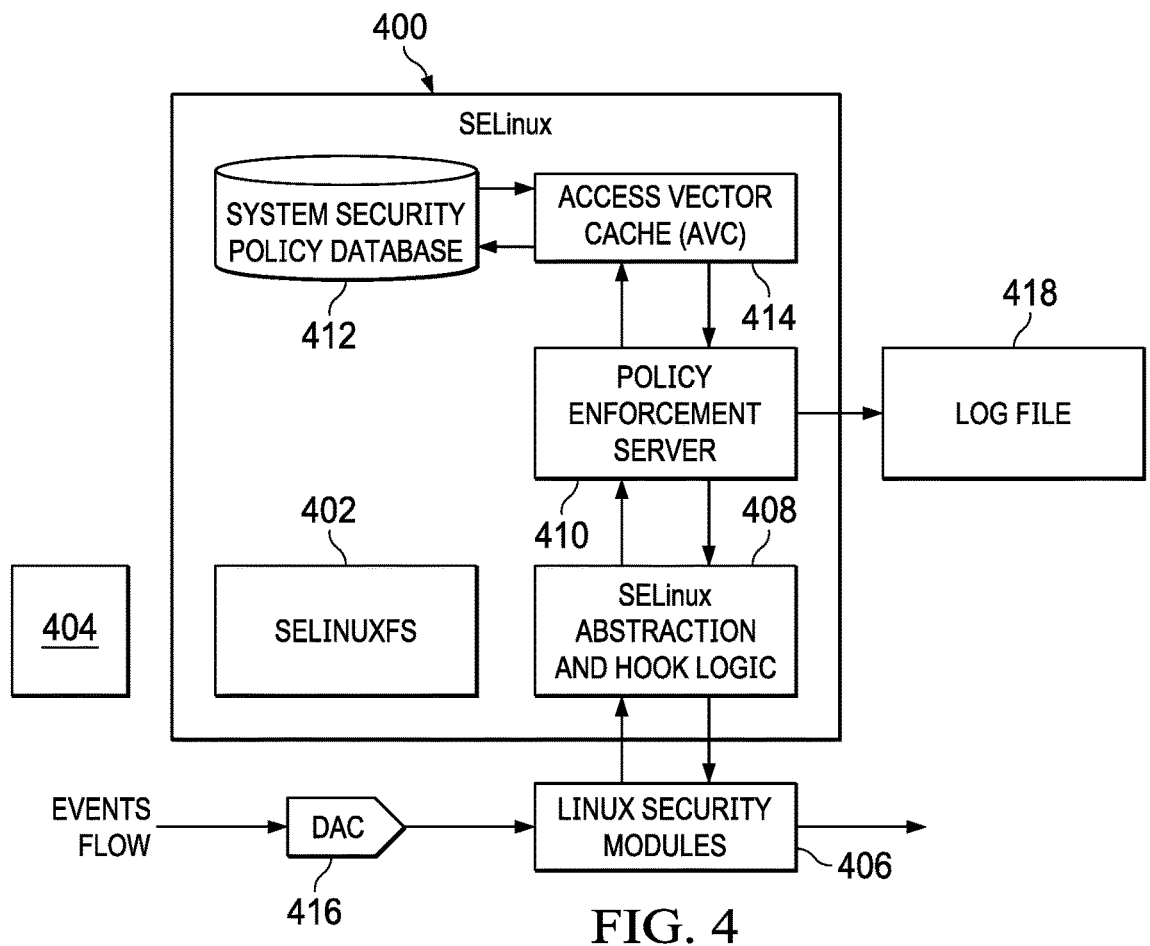
FIG. 4 depicts an architecture for a machine running SELinux operating system.

SELinux added MAC to the GNU/Linux operating system, and it leverages the Linux Security Module (LSM) framework. The LSM provides a general-purpose framework for security that allows security models to be implemented as loadable kernel modules. FIG. 4 depicts SELinux 400, which typically comprises a set of components: auxiliary modules 402 for operating with a file system 404, Linux security modules 406 for interacting with a LSM abstraction and hook logic subsystem 408, a policy enforcement server 410, a system security policy database 412, and an access vector cache subsystem 414. The policy enforcement server 410 is the security server entity in the kernel that makes the decision if an action on an object by a subject is allowed, per security policy. The access vector cache (AVC) caches the security decisions taken by the security server, thereby improving system performance. The security server uses a security context to decide if an access is allowed. SELinux Security context is a variable length string comprising a SELinux User, a SELinux Role, and a type identifier. A SELinux User name is associated with a group or class of users related to security policies at the SELinux level, and every Linux user name has an associated SELinux user name. A single SELinux user name may be assigned to more than one Linux user name. Each SELinux User also is associated with one or more SELinux roles, with each role associated with one or more domains to facilitate role-based access control.

In operation, an operating system subject (an entity such as a person, a process or a device) attempts to perform a certain action on a particular object (system resource such as a file, a directory, a socket, a network interface, etc.), which action is permitted with the DAC standard discretionary security model 416. Every request to perform the action with the object is intercepted by the LSM 406 and is transferred, along with the subject's and object's security context, to the SELinux abstraction and hook logic subsystem 408, which is responsible for interaction with LSM. The information received from the SELinux abstraction and hook logic subsystem 408 is forwarded to the basic policy enforcement server 410 module, which is directly responsible for making the decision about allowing the subject to access the object. To receive the regarding whether the action is allowed or prohibited, the policy enforcement server 410 contacts the AVC subsystem 414, which caches the rules being used. If the AVC 414 does not contain the cached decision for the relevant policy, the request for the necessary security policy is forwarded to the security policy database 412. When the security policy has been found, it is transferred to the policy enforcement server. If the requested action complies with the policy that has been found, the operation is permitted. Otherwise, it is prohibited. The decision-making information is written to an SELinux log file 418.

SELinux 400 operates in one of two global modes: permissive mode, in which permission denials are logged but not enforced, and enforcing mode, in which permissions denials are both logged and enforced. SELinux also supports a per-domain permissive mode in which specific domains (processes) can be made permissive while placing the rest of the system in global enforcing mode. A domain is simply a label identifying a process or set of processes in the security policy, where all processes labeled with the same domain are treated identically by the security policy. Per-domain permissive mode enables incremental application of SELinux to an ever-increasing portion of the system and policy development for new services (while keeping the rest of the system enforcing).

As noted above, Android is a popular Linux-based mobile device operating system The Android security model is based in part on the concept of application sandboxes, wherein each mobile application runs in its own sandbox. Prior to Android 4.3, these sandboxes were defined by the creation of a unique Linux UID for each application at time of installation. Starting with Android 4, SELinux (such as depicted and described) has been used to further define the boundaries of the Android application sandbox. SEAndroid, which is built on top of SELinux, provides for enhanced application sandboxing by strengthening data isolation between applications, and between applications and system services. In part, this is accomplished by extending mandatory access control functions on Inter-Process Communications (IPC), and on Android permissions. SEAndroid addresses several security concerns associated with SELinux including prevention of privilege escalation attacks that have been used by malicious or compromised applications.

Thus, SEAndroid may be generalized as an application sandbox-based mobile device operating system that executes mandatory access control on inter-process communications (IPC) and permissions.

The following discussion presumes the reader is familiar with SEAndroid.

Advanced Persistent Threat (APT) Detection

By way of additional background, advanced persistent threats (APTs) refer to a category of high-risk threats to a computing entity by so-called threat actors. Data exfiltration (also known as data extrusion) is the primary goal of this malicious activity; typically, it refers to the unauthorized transfer of sensitive information from a target's device or network to a location that a threat actor controls. Server-based APT mitigation solutions, such as IBM® Trusteer Apex, provide automated systems and method to address data exfiltration and other attacks, such as zero-day application exploits. These types of system work by analyzing application state and understanding what the application is doing and why it is doing it. Trusteer Apex can automatically and accurately determine if an application action is legitimate or malicious. Typically, it is deployed and enforced on managed and unmanaged endpoints in an enterprise environment to prevent exploits and malware from compromising those endpoints and extracting information.

APT mitigation solutions such as described identify data exfiltration, among other methods, by seeing that an untrusted executable reads information that is potentially sensitive, and then connects to a remove system and sends it information. While the approach works well, in certain circumstances, such as a custom application, this methodology results in a false positive. In particular, although the custom application is reading information, what it may then send to the remote location may be completely unrelated to the read activity.

APT mitigation and prevention technologies are well-known. For example, IBM Trusteer Apex is an automated solution that prevents exploits and malware from compromising enterprise endpoints and extracting information. This solution provides several layers of security, namely, exploit prevention, data exfiltration prevention, and credentials protection. Apex focuses on the behaviors of a small group of applications responsible for most exploitation events—Java™ technology, Adobe® Reader and Flash®, and Microsoft® Office.

In a typical embodiment, the APT solution is architected generally as agent code 500 executing in enterprise endpoint 502, together with a web-based console 504 that enables IT security to manage the deployment (of both managed and unmanaged endpoints) from a central control position. The agent code 500 operates by monitoring an application state at the time the application 506 executes sensitive operations, e.g., writing a file to the file system. Generally, the agent 500 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability.

Figure 5:
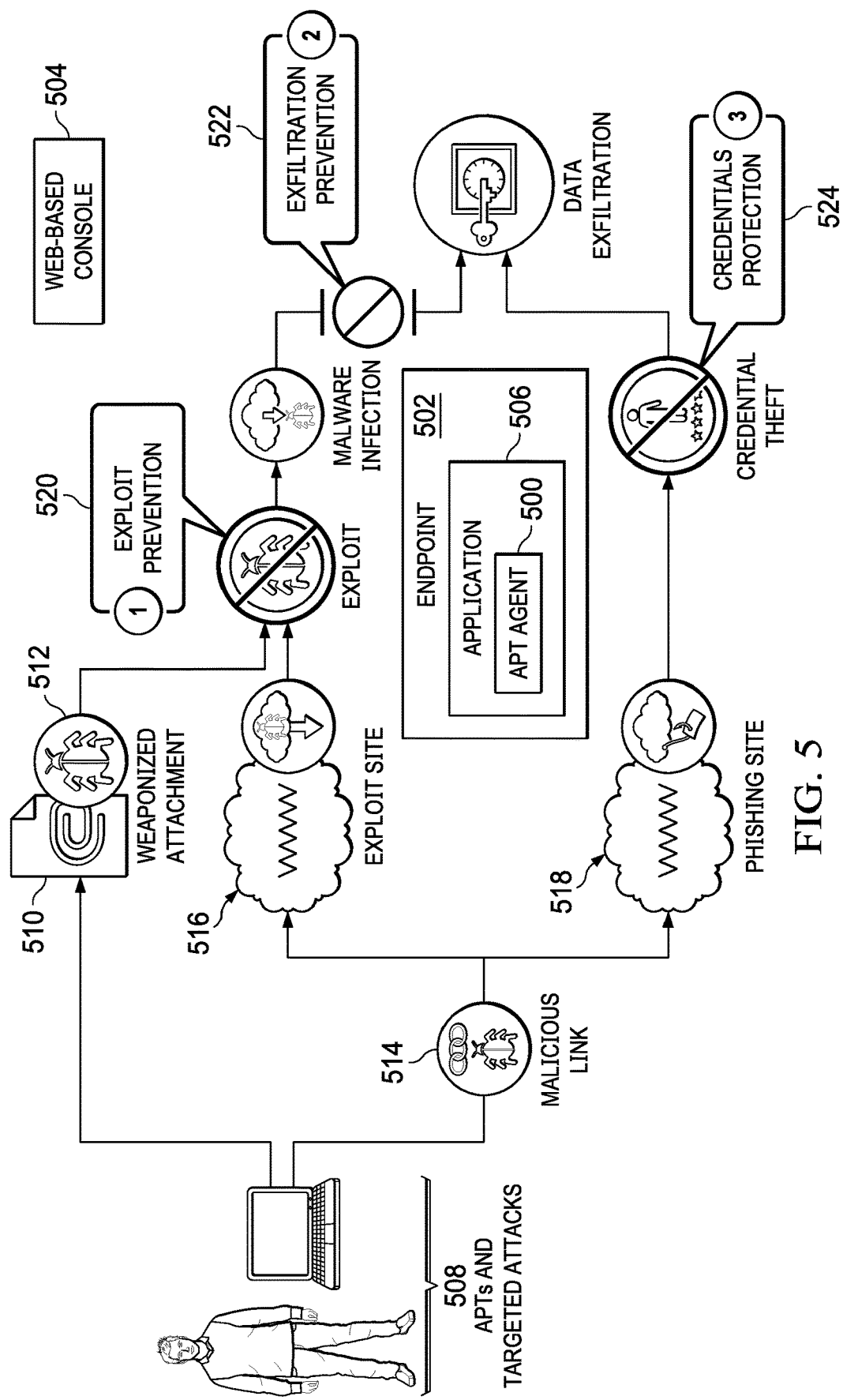
FIG. 5 depicts how an Advanced Persistent Threat (APT) agent works in association with an endpoint in an enterprise environment to identify a potential data exfiltration.

FIG. 5 depicts how APT attacks typically unfold and the points at which the APT solution is operative to stop the intrusion.

The attacker 508 can use a spear-phishing email 510 to send an employee a weaponized document, one that contains hidden exploit code 512. When the user opens the document with a viewer, such as Adobe Acrobat or Word, the exploit code runs and attaches to an application vulnerability to silently download malware on the employee computer 502. The employee is never aware of this download. Another option is to send a user a link 514 to a malicious site. It can be a malicious website 516 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 518 to convince the user to submit corporate credentials. After infecting the computer 502 with advanced malware or compromising corporate credentials, attacker 508 has established a foothold within the corporate network and then can advance the attack.

As depicted, the agent 500 protects the enterprise against such threats at several junctions: (1) exploit prevention 520 that prevents exploiting attempts from compromising user computers; (2) exfiltration prevention 522 that prevents malware from communicating with the attacker and sending out information if the machine is already infected with malware; and (3) credentials protection 524 that prevent users from using corporate credentials on non-approved corporate sites (including phishing or and public sites like social networks or e-commerce, for example). As noted above, preferably the agent performs these and related operations by monitoring the application and its operations using a whitelist of legitimate application states.

Information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Docs). The agent 500 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

Further, the reference to an "agent" is not intended to be limiting. The "agent" may be any code-based module, program, process, component, thread or the like.

The above-described example (as shown in FIG. 5) illustrates that APT attacks typically consist of long attack vectors, which first take the steps of probing and penetrating into systems, following steps to collect information and to move around, and then the last steps to locate their targets and perform harmful operations, such as data exfiltration and system sabotage. Existing MAC mechanisms, such as SELinux, are good at blocking initial steps in attacks and thus defending against primitive and simple attack, but this type of stateless enforcement cannot foresee or reason against long attack vectors before taking actions. This often results in false alarms that prevent a benign application from running, or false negatives if a malicious attack plot is made up of benign components.

Mobile Device OS Mandatory Access Control (MAC) in Permissive Mode for APT Detection With the above as background, the subject matter of this disclosure is now described.

According to this disclosure, advanced persistent threats to a mobile device are detected and prevented by leveraging the built-in mandatory access control (MAC) environment in the mobile operating system in a "stateful" manner. To this end, the mandatory access control environment provided by the mobile device operating system is placed in a permissive mode of operation wherein permission denials are logged but not enforced. Further, the mobile device security environment is augmented to include a monitoring application that is instantiated with system privileges. In operation, the application monitors application execution parameters of one or more mobile applications executing on the device. These application execution parameters including, without limitation, the permission denials, are collected and used by the monitoring application to facilitate a stateful monitoring of the operating system security environment. In particular, and rather than just responding immediately to a permission denial generated by the mandatory access control, the approach herein delays responding to the denial (e.g., by shutting down an affected process) such that the detection environment in effect changes from being "stateless" to one that is "stateful." Security-sensitive events are generated over a time period as the APT attack vector proceeds, and the application execution parameters are collected and assembled, preferably into a "signature." This signature is then analyzed for a match against a set of signatures representing APT attack vectors that are available to the system. Upon detection of a match, the mobile device operating system can then take an appropriate mitigation or remediation action, such as terminating the malicious process, issuing a notification, modifying a security parameter, or the like. In this manner, and instead of responding to an anomaly in a stateless manner, the system works statefully to identify an advanced persistent threat (APT) that otherwise leverages multiple steps using individually benign components. In effect, the approach overrides the normal operation of the mandatory access control environment so that APT detection is enabled.

Figure 6:
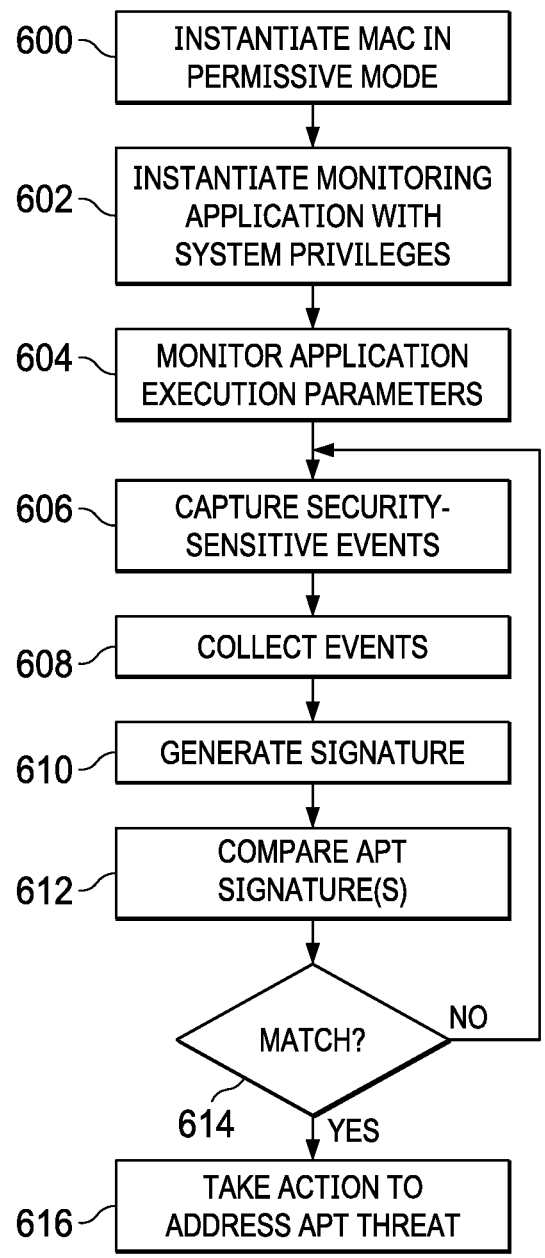
FIG. 6 depicts the mobile device APT detection and mitigation technique of this disclosure.

FIG. 6 depicts the mobile device APT detection and mitigation technique of this disclosure. In one embodiment, the mobile device is implemented as depicted in FIG. 3, with the Android operating system implementing SELinux such as shown in FIG. 4, supplemented to include SEAndroid support also as previously described. The process begins at step 600 by instantiate mandatory access control (MAC) in a permissive mode of operation. This operation may be implemented by a user configuration, by automation, or programmatically. The operation may be taken in response to occurrence of an event as detected in the operating environment of the mobile device, or perhaps even within an operating environment of a network in which the mobile device is used (or is accessing). At step 602, a monitoring application is instantiated by the mobile device operating system. The monitoring application corresponds to application 310 in FIG. 3. Unlike a typical mobile application running on the device, however, the monitoring application is instantiated with system privileges. The step 602 may be carried out in advance, or upon a given occurrence, and steps 600 and 602 may occur concurrently. The monitoring application may be an application or process dedicated for monitoring (for APT detection), or it may leverage the monitoring functionality native or otherwise inherent in some other monitoring application that is already present on the mobile device. Thus, step 602 more generally relates to the notion of instantiating a monitoring function or operation by associated some monitoring application/process with system privileges.

With monitoring in place, the process flow continues at step 604 with the monitoring application acting to monitor application execution parameters as one or more mobile applications are executed, typically in the ordinary course of use of the device. As noted above, APTs typically exhibit long attack vectors, thus, step 604 is carried out over some time period during which the actions/operations that constitute the APT are likely to take place. The particular time period over which the monitoring continues will vary depending on the nature and type of APT attack vector, and thus it is assumed that the monitoring (step 604 is a continuous process, operation or function of the device. At step 606, a set of one or more security-sensitive events are captured. Typically, a security-sensitive event is a set of one or more application execution parameters that are generated when an application on the mobile device takes some normal or typical action expected of the application (e.g., receives a request, processes a request, provides a response, etc.) but that may have larger significance when viewed in the context of an APT attack vector. Thus, typically a security-sensitive event is some operation or activity that itself does not generate an APT response but, rather, become a piece of data (or a data set) that might indicate that the operation or activity—although benign, is part of an attack. At least one application execution parameter is a permission denial that is generated by the mandatory access control environment having been set to operate in the permissive mode of operation (at step 600).

At step 608, the set of security-sensitive events captured are assembled (aggregated) together. This operation may include other data processing, such as normalization, filtering, augmentation, and the like. At step 610, a signature representing the set of security-sensitive events is generated. Signature-generation algorithms for this purpose include, without limitation, [IDENTIFY]. At step 612, the generated signature is compared against a set of APT signatures that are available to the system. Signature matching algorithms for this purpose include, without limitation, [IDENTIFY]. In one typical embodiment, the signatures are obtained from an APT detection platform (or more generally, from some behavior analysis-based system, device, platform or service), such as described above with respect to FIG. 5. In a typical but non-limiting implementation, the mobile device receives a set of APT signatures (representing known APT attack vectors) from the platform, or it may interact with the platform (or some similar service) when step 612 is carried out. The signature set may be received in an off-line process and stored in a protected memory area of the mobile device. As used here, the nomenclature of a "signature" is not intended to be limiting, as the collection of security-sensitive events may be combined into some other type of construct such as a "model" or "fingerprint" or, more generally, a data set against which the comparison can then be carried out.

At step 614, a test is performed to determine whether the set of security-sensitive events match against a signature that is indicative of an advanced persistent threat (APT). If the outcome of the test is negative, the routine either cycles or returns to step 606 to capture additional security-sensitive events. If, however, the outcome of the test at step 614 is positive, which indicates a match between the signature generated and one of the signatures in the match set, the routine then continues at step 616. At step 616, an action is taken to respond to the advanced persistent threat that has now been determined to exist. The response action taken will depend on the nature of the APT attack, but it may be a passive action, e.g., terminating a connection, collecting an attack payload, and/or notifying a security analyst, or it may be an active action, such as transparently moving the current execution thread of an application (e.g., a last one in the APT vector) into a decoy sandbox for further execution and in-depth analysis, terminating a process, providing a notification or disinformation, temporarily activating rules to block an IP address, or the like. A combination of both passive and active response may be implemented of course.

In this manner, the approach herein in effect delays a response to one or more security-sensitive events until the signature match is found to have occurred. The match in effect indicates that the system now has confidence that an attack (as evidenced by the security-sensitive events) in fact is on-going. Depending on the nature and type of APT attack, this confidence typically is expressed by a predetermined metric being reached or determined to exist, as evidenced by the signature.

To summarize, the technique preferably leverages MAC infrastructure (e.g., SEAndroid in Android OS) in a system to monitor application executions and thereby construct a stateful detection and response process for identifying APT attacks. This detection mechanism advantageously aligns with the long-term, multi-step nature of APT attacks, and it gains more knowledge in detecting APT attacks than stateless enforcement systems deployed with MAC infrastructure. All that is necessary to facilitate the technique is to provide or deploy a monitoring application with system privileges on the existing mobile system, and any stateful signature matching mechanism can be used to compute the confidence of the detected attack plot before reaction.

The technique herein leverages existing mandatory access control-type mechanisms for monitoring purposes, and it delays the detection and reaction while evidence (the series of security-sensitive events) is collected and the confidence of the detection surpasses a predefined threshold. This provides several significant advantages over the traditional use of MAC for APT detection. First, long-term, stateful detection as described herein leads to more precise measurement of the suspicious score of the application, and it yields better detection results with less false alarms and false negatives. The delayed detection makes it possible for security analysts to better understand the intent of the attackers if additional forensic processing or analysis is needed in attack investigation. Further, the approach herein supports more sophisticated reaction taken by human user or analysts other than simply blocking known penetration steps, which could incur more-stealthy attack steps. Another advantage is that the approach can be built natively into all Android mobile devices and other similar systems with built-in mandatory access control mechanism without system modification. As noted, all that is needed to place the MAC into the appropriate permissive mode, and to add a monitoring app with system privilege, which is very easy to deploy on an existing mobile system.

The described approach, which uses the MAC mechanism in a permissive mode to further track the behavior of one or more application executions until a point occurs that some program is then exhibiting suspicious behavior (e.g., its risk score is above a predefined threshold), then the system can take appropriate action, e.g., kill the process and alert the user to delete the relevant program. Therefore, the user encounters less false alerts, as the approach enables the monitoring program more time to collect security sensitive events about a process before finally terminating the malicious process on the device. By relaxing the MAC mechanism with the permissive mode, the monitoring process (which preferably includes the signature matching as previously described) thus makes more accurate measurement or evaluation of the true maliciousness of a process. This significantly reduces the false positives for APT detection on mobile devices.

The techniques herein are not limited for use with mobile devices running SEAndroid, although that will be a typical implementation. Other Linux security modules (LSM) that may benefit from the approach include, e.g., Tomoyo Linux and AppArmor, and a similar approach may also be implemented in operating systems (other than SELinux with SEAndroid) that support mandatory access control, such as Trusted Solaris and Trusted AIX. The approach may also be implemented in other mobile device operating systems, such as iOS.

Generalizing, the functionality described may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in conjunction with various server-side architectures that facilitate the APT signature generation or checking, including simple n-tier architectures, web portals, federated systems, or other loosely-coupled server (including a "cloud"-based) environments.

Still more generally, the subject matter described herein can take the form of an entirely hardware embodiment, an entirely software embodiment or an embodiment containing both hardware and software elements. In a preferred embodiment, the functionality on each of the two sides of the visual authentication channel is implemented in software, which includes but is not limited to firmware, resident software, microcode, and the like. As noted above, these functions may be integrated into other applications (such as webmail, document sharing, or the like), or built into software for this specific purpose (of facilitating the visual data exchange channel). Furthermore, the device-specific functionality on either side of the channel can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, computing entities that manage access to resources, as well as improvements to the functioning of access control systems and devices.

Having described our invention, what we claim is as follows:

1. A method to secure a mobile device operating system that enforces a mandatory access control (MAC) security model, comprising:
instantiating mandatory access control (MAC) in the mobile device operating system in a permissive mode of operation in which permission denials are logged but not enforced;
monitoring application execution parameters as one or more applications are executed;
collecting, as a set of security-sensitive events, the application execution parameters including one or more permission denials generated by the MAC operating in the permissive mode of operation, the collected set of security-sensitive events representing a monitored state of the mobile device operating system;
determining whether the set of security-sensitive events representing the monitored state match against a signature that is indicative of an advanced persistent threat (APT); and
taking an action to mitigate the advanced persistent threat upon determining that the set of security-sensitive events match against the signature.

2. The method as described in claim 1 wherein the application execution parameters are monitored using a monitoring application instantiated by the mobile device operating system with system privileges.

3. The method as described in claim 1 wherein the mobile device operating system is an application sandbox-based operating system that executes mandatory access control on inter-process communications (IPC) and permissions.

4. The method as described in claim 1 wherein the application execution parameters are collected over a given time period.

5. The method as described in claim 4 further including delaying a response to the set of security-sensitive events until a confidence level of an attack as evidenced by the security-sensitive events exceeds a predetermined metric as evidenced by the signature.

6. The method as described in claim 5 further including declaring the APT when the confidence level is reached.

7. Apparatus, comprising:
a processor;
computer memory holding computer program instructions executed by the processor to secure a mobile device operating system that enforces a mandatory access control (MAC) security model, the computer program instructions comprising program code configured to:
instantiate mandatory access control (MAC) in the mobile device operating system in a permissive mode of operation in which permission denials are logged but not enforced;
monitor application execution parameters as one or more applications are executed;
collect, as a set of security-sensitive events, the application execution parameters including one or more permission denials generated by the MAC operating in the permissive mode of operation, the collected set of security-sensitive events representing a monitored state of the mobile device operating system;
determine whether the set of security-sensitive events representing the monitored state match against a signature that is indicative of an advanced persistent threat (APT); and
take an action to mitigate the advanced persistent threat upon determining that the set of security-sensitive events match against the signature.

8. The apparatus as described in claim 7 wherein the application execution parameters are monitored using a monitoring application instantiated by the mobile device operating system with system privileges.

9. The apparatus as described in claim 7 wherein the mobile device operating system is an application sandbox-based operating system that executes mandatory access control on inter-process communications (IPC) and permissions.

10. The apparatus as described in claim 7 wherein the application execution parameters are collected over a given time period.

11. The apparatus as described in claim 10 wherein the program code is further configured to delay a response to the set of security-sensitive events until a confidence level of an attack as evidenced by the security-sensitive events exceeds a predetermined metric as evidenced by the signature.

12. The apparatus as described in claim 11 wherein the program code is further configured to declare the APT when the confidence level is reached.

13. A non-transitory computer readable storage medium, storing thereon a computer program product, the computer program product comprising computer program instructions executed by a hardware processor to secure a mobile device operating system that enforces a mandatory access control (MAC) security model, the computer program instructions comprising program code configured to:
  instantiate mandatory access control (MAC) in the mobile device operating system in a permissive mode of operation in which permission denials are logged but not enforced;
  monitor application execution parameters as one or more applications are executed;
  collect, as a set of security-sensitive events, the application execution parameters including one or more permission denials generated by the MAC operating in the permissive mode of operation, the collected set of security-sensitive events representing a monitored state of the mobile device operating system; and
  determine whether the set of security-sensitive events representing the monitored state match against a signature that is indicative of an advanced persistent threat (APT); and
  take an action to mitigate the advanced persistent threat upon determining that the set of security-sensitive events match against the signature.

14. The non-transitory computer readable storage medium as described in claim 13 wherein the application execution parameters are monitored using a monitoring application instantiated by the mobile device operating system with system privileges.

15. The non-transitory computer readable storage medium as described in claim 13 wherein the mobile device operating system is an application sandbox-based operating system that executes mandatory access control on inter-process communications (IPC) and permissions.

16. The non-transitory computer readable storage medium as described in claim 13 wherein the application execution parameters are collected over a given time period.

17. The non-transitory computer readable storage medium as described in claim 16 wherein the program code is further configured to delay a response to the set of security-sensitive events until a confidence level of an attack as evidenced by the security-sensitive events exceeds a predetermined metric as evidenced by the signature.

18. The non-transitory computer readable storage medium as described in claim 17 wherein the program code is further configured to declare the APT when the confidence level is reached.

* * * * *